US012789204B2

(12) United States Patent
Huang

(10) Patent No.: US 12,789,204 B2
(45) Date of Patent: Nov. 10, 2026

(54) LIQUID WARMING AND EJECTING DEVICE

(71) Applicant: Shenzhen Alltokee Technology Co., Ltd, Shenzhen (CN)

(72) Inventor: Minyi Huang, Lianping (CN)

(73) Assignee: Shenzhen Alltokee Technology Co., Ltd, Shenzhen (CN)

( * ) Notice: Subject to any disclaimer, the term of this patent is extended or adjusted under 35 U.S.C. 154(b) by 134 days.

(21) Appl. No.: 18/822,353

(22) Filed: Sep. 2, 2024

(65) Prior Publication Data

US 2024/0416366 A1 Dec. 19, 2024

(30) Foreign Application Priority Data

Jul. 11, 2024 (CN) ........................ 202421634747.8

(51) Int. Cl.
*B05B 1/24* (2006.01)

(52) U.S. Cl.
CPC ..................................... *B05B 1/24* (2013.01)

(58) Field of Classification Search
CPC ........ A45D 2200/155; A45D 2200/058; A45D 2200/055; A45D 2200/056; B05C 17/005; B29B 13/02; B23K 3/06; B01F 2035/99; B05B 9/002; B05B 9/0838
USPC .......................................... 222/146.2, 146.5
See application file for complete search history.

(56) References Cited

U.S. PATENT DOCUMENTS

| | | | | | |
|---|---|---|---|---|---|
| 2,576,393 | A * | 11/1951 | Flanagan | B23K 3/0615 | 219/230 |
| 3,377,012 | A * | 4/1968 | Cushman | B23K 3/0607 | 219/241 |
| 3,744,921 | A * | 7/1973 | Weller | B05C 17/00533 | D8/30 |
| 3,826,224 | A * | 7/1974 | Baker | B29C 65/4815 | 118/410 |
| 4,065,034 | A * | 12/1977 | Callan | B05C 17/005 | 222/391 |
| 4,317,529 | A * | 3/1982 | Leibhard | B05C 17/00546 | 219/421 |
| 5,026,187 | A * | 6/1991 | Belanger | B05C 17/00533 | 219/505 |
| 6,131,766 | A * | 10/2000 | King | B67D 7/0216 | 222/326 |
| 6,991,457 | B2 * | 1/2006 | Kazen | A61C 5/62 | 433/32 |

(Continued)

*Primary Examiner* — Charles P. Cheyney
(74) *Attorney, Agent, or Firm* — Hemisphere Law, PLLC

(57) ABSTRACT

The present utility model provides a liquid warming and ejecting device, including a liquid discharge cylinder and a liquid heating and ejecting assembly, wherein the liquid discharge cylinder includes a first end and a second end which are disposed opposite to each other, the second end is disposed towards the liquid heating and ejecting assembly, and a channel is disposed in the liquid discharge cylinder. A silicone rubber plug is fixed at a position on the channel corresponding to the second end, and is provided with a liquid discharge slit in the middle; the liquid heating and ejecting assembly includes a liquid storage housing, a liquid storage tank, a warming device, and a piston, the liquid storage tank is fixed in the liquid storage housing, the warming device is fixed on an outer periphery of the liquid storage tank, and the piston is located inside the liquid storage tank.

9 Claims, 8 Drawing Sheets

(56) References Cited

U.S. PATENT DOCUMENTS

| | | | | |
|---|---|---|---|---|
| 8,033,430 | B2 * | 10/2011 | Salmela | A47J 31/40<br>222/642 |
| 2004/0131437 | A1 | 7/2004 | Kasai et al. | |
| 2010/0065154 | A1 * | 3/2010 | Globerman | A61J 1/2089<br>141/330 |
| 2015/0264107 | A1 * | 9/2015 | Harz | G06N 20/00<br>707/740 |
| 2020/0128941 | A1 * | 4/2020 | Dudik | A45D 44/00 |
| 2022/0040974 | A1 | 2/2022 | Hori et al. | |
| 2022/0379603 | A1 | 12/2022 | Hori et al. | |

* cited by examiner

LIQUID WARMING AND EJECTING DEVICE

BACKGROUND OF THE INVENTION

Technical Field

The present utility model relates to the field of liquid ejecting apparatuses, and in particular to a liquid warming and ejecting device.

Description of Related Art

Essential oil, hand sanitizers, shower gel and the like are all common liquids in daily life for soothing and relaxing, antisepsis and anti-inflammation, body cleaning or the like.

At present, when in use, some of the above liquids sold with original squeezable packaging bottles can be directly squeezed for use, while some liquids without original squeezable packages are usually sub-packaged in squeezable sub-packaging bottles for subsequent use.

However, some of the liquids when in use need to be heated so as to achieve a better effect, and the above squeezable sub-packaging bottles and the original liquid packages do not have a heating function. Therefore, there is an urgent need of a liquid ejecting device to solve the above problem.

BRIEF SUMMARY OF THE INVENTION

Based on the above current situation, a main object of the present utility model is to provide a liquid warming and ejecting device to solve the problem that some of the liquids when in use need to be heated so as to achieve a better effect, and the current squeezable sub-packaging bottles and the original liquid packages do not have a heating function.

To achieve the object above, the present utility model employs a technical solution as follows:

a liquid warming and ejecting device includes a liquid discharge cylinder and a liquid heating and ejecting assembly, wherein the liquid discharge cylinder includes a first end and a second end which are disposed opposite to each other, the second end is disposed towards the liquid heating and ejecting assembly, and a channel is disposed in the liquid discharge cylinder; a silicone rubber plug is fixed at a position on the channel corresponding to the second end, and is provided with a liquid discharge slit in the middle;

the liquid heating and ejecting assembly includes a liquid storage housing, a liquid storage tank, a warming device, and a piston, the liquid storage tank is fixed in the liquid storage housing, the warming device is fixed on an outer periphery of the liquid storage tank, and the piston is located inside the liquid storage tank; and a first discharge pipe is fixed to an end of the liquid storage housing, a second discharge pipe is fixed to an end of the liquid storage tank, and the second discharge pipe is inserted in the first discharge pipe and can be communicated to a mounting slit and the channel.

Preferably, the liquid warming and ejecting device further includes a fixing assembly;

the fixing assembly includes a fixing bracket and a fixing member, the fixing bracket includes a bottom ring, a convex ring, and a plurality of inclined plane portions, the bottom ring and the convex ring are connected by means of the inclined plane portions, and several fixing columns are fixed to upper sides of the inclined plane portions; and the fixing member includes a disc and an outer ring, the disc is fixed in the outer ring, a discharge hole is provided in the middle of the disc, and a surface of the disc is provided with a plurality of through holes that are connected to the fixing columns.

Preferably, a mounting ring is fixed inside the convex ring, in which a mounting groove is provided, the mounting groove can be inserted in the channel, and the silicone rubber plug is fixed inside the mounting groove.

Preferably, a press ring is fixed to a side of the disc close to the fixing bracket, and is disposed coaxial with the discharge hole, and the press hole can tightly bear against the silicone rubber plug.

Preferably, an inner side of the warming device bears against the outer periphery of the liquid storage tank.

Preferably, the liquid storage housing includes a large-diameter ring and a small-diameter ring which can be inserted in the outer ring; and a plurality of bumps is fixed to an inner side of the outer ring, a plurality of fixing grooves is provided on a side periphery of the small-diameter ring, the fixing grooves include longitudinal grooves and circumferential grooves, and the bumps can be inserted in the longitudinal grooves and can rotate to ends of the circumferential grooves.

Preferably, the circumferential grooves are each provided with a clamping protrusion, which can be clamped and connected to the corresponding bump, both ends of which are provided with inclined planes.

Preferably, the liquid storage tank is provided with an open end, the liquid heating and ejecting assembly further includes a sealed cover capable of sealing the liquid storage tank, and the sealing cover is detachably connected to the liquid storage housing.

Preferably, a first annular groove is provided on a side of the sealing cover, the first annular groove is internally fixed with a first seal ring, and the liquid storage tank can be inserted in the first annular groove and tightly bear against the first seal ring; and a second annular groove is provided in a periphery of the first discharge pipe, a second seal ring is fixed in the second annular groove, and the second seal ring tightly bears against the press ring.

Preferably, a first rubber seal ring is disposed on an inner side of the first discharge pipe; the rubber seal ring includes a first ring portion and a second ring portion located on an inner periphery of the first ring, an outer periphery of the first ring portion tightly bears against an inner periphery of the first discharge pipe, and an end surface of the second ring portion tightly bears against an inner end surface of the first discharge pipe.

The present utility model has the following beneficial effects: during work, the warming device can be located outside the liquid storage tank to produce heat for warming a liquid in the liquid storage tank to certain temperature, and the piston can move towards the liquid discharge cylinder and thus push the heated liquid in the liquid storage tank to be discharged via the first discharge pipe and the second discharge pipe; and the discharged liquid under continuous pressurized advancing of the piston is discharged from the liquid discharge slit in the silicone rubber plug into the channel and then discharged from the second end, such that the liquid can be heated and ejected, providing better use experience to a user.

Other beneficial effects of the present utility model will be set forth through the introduction of specific technical features and technical solutions in the detailed description, and those skilled in the art should be able to understand the beneficial effects brought about by the technical features and technical solutions as described through the introduction of these technical features and technical solutions.

DESCRIPTION OF REFERENCE SIGNS

1, housing; 11, male piece; 12, female piece; 2, liquid discharge cylinder; 21, first end; 22, second end; 23, channel; 3, fixing assembly; 31, fixing bracket; 311, bottom ring; 312, convex ring; 3121, mounting ring; 3122, mounting groove; 3123, silicone rubber plug; 3124, liquid discharge slit; 313, inclined plane portion; 314, fixing column; 32, fixing member; 321, disc; 3211, discharge hole; 3212, through hole; 322, outer ring; 3221, bump; 3222, inclined plane; 323, press ring; 4, liquid heating and ejecting assembly; 41, liquid storage housing; 411, first discharge pipe; 4111, second annular groove; 4112, second seal ring; 412, large-diameter ring; 413, small-diameter ring; 42, liquid storage tank; 421, second discharge pipe; 43, warming device; 44, piston; 45, seal cover; 451, first annular groove; 4511, first seal ring; 452, accommodation groove; 4521, temperature-controlled heating current-conducting plate; 4522, temperature control assembly; 46, fixing groove; 461, longitudinal groove; 462, circumferential groove; 463, clamping protrusion; 5, power device; 6, rubber seal ring; 61, first ring portion; 62, second ring portion.

DETAILED DESCRIPTION OF THE INVENTION

The present utility model is described below based on embodiments, but is not only limited to these embodiments. In the detailed description of the present utility model below, some specific details are described in detail, and the well-known methods, processes, flow processes, and elements are not described in detail in order to avoid confusion about the essence of the present utility model.

In addition, those ordinarily skilled in the art should understand that the drawings are provided here for an illustrative purpose, and are not necessarily drawn to scale.

Unless otherwise expressly required in the context, words such as “comprise”, “include” or other similar words throughout the Specification and Claims should be construed as having the meaning of inclusion rather than exclusion or exhaustion, i.e., having the meaning of “including but not limited to”.

In the description of the present utility model, it should be understood that the terms “first”, “second” and “third” or the like are for descriptive purposes only and should not be construed as indicating or implying relative importance. In addition, in the description of the present utility model, unless otherwise specified, “a plurality of” means two or more.

Figure 1:
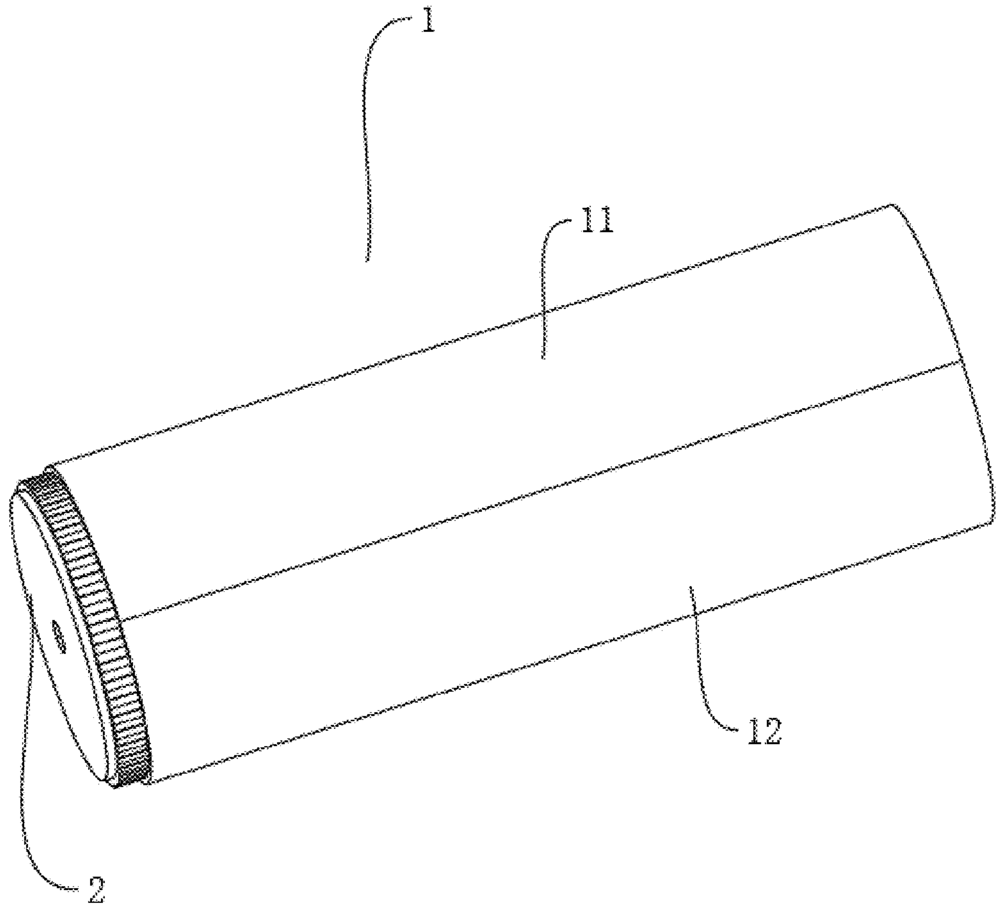
FIG. 1 is a schematic structural diagram of a liquid warming and ejecting device according to the present utility model.
Figure 2:
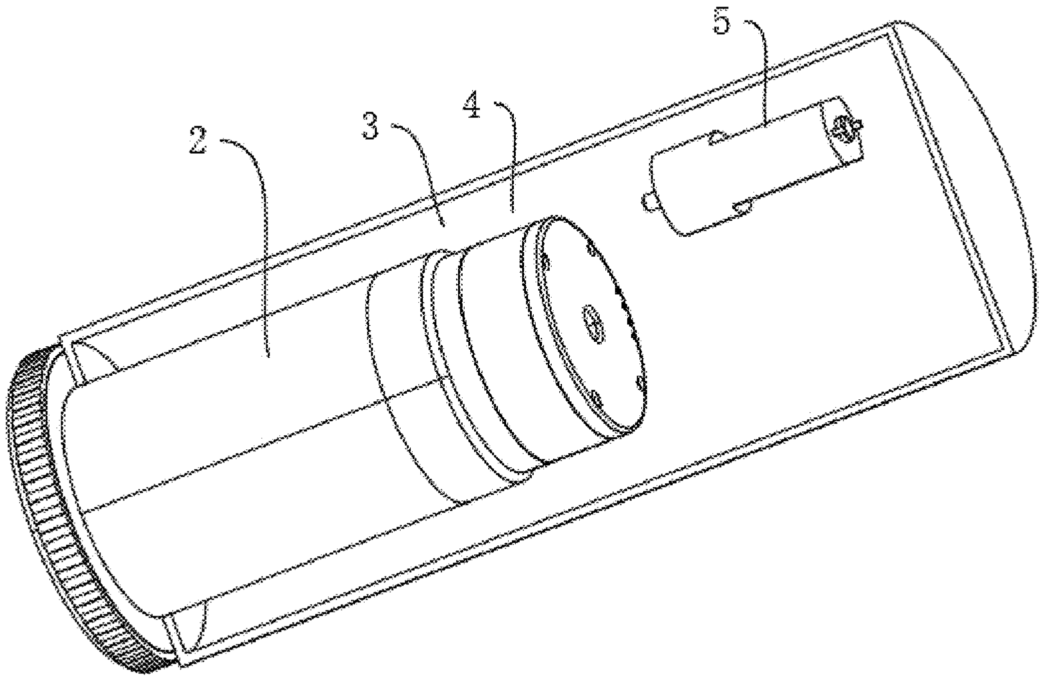
FIG. 2 is a schematic diagram of a stereoscopic structure of a liquid warming and ejecting device according to the present utility model for the purpose of exhibiting a liquid discharge cylinder.
Figure 3:
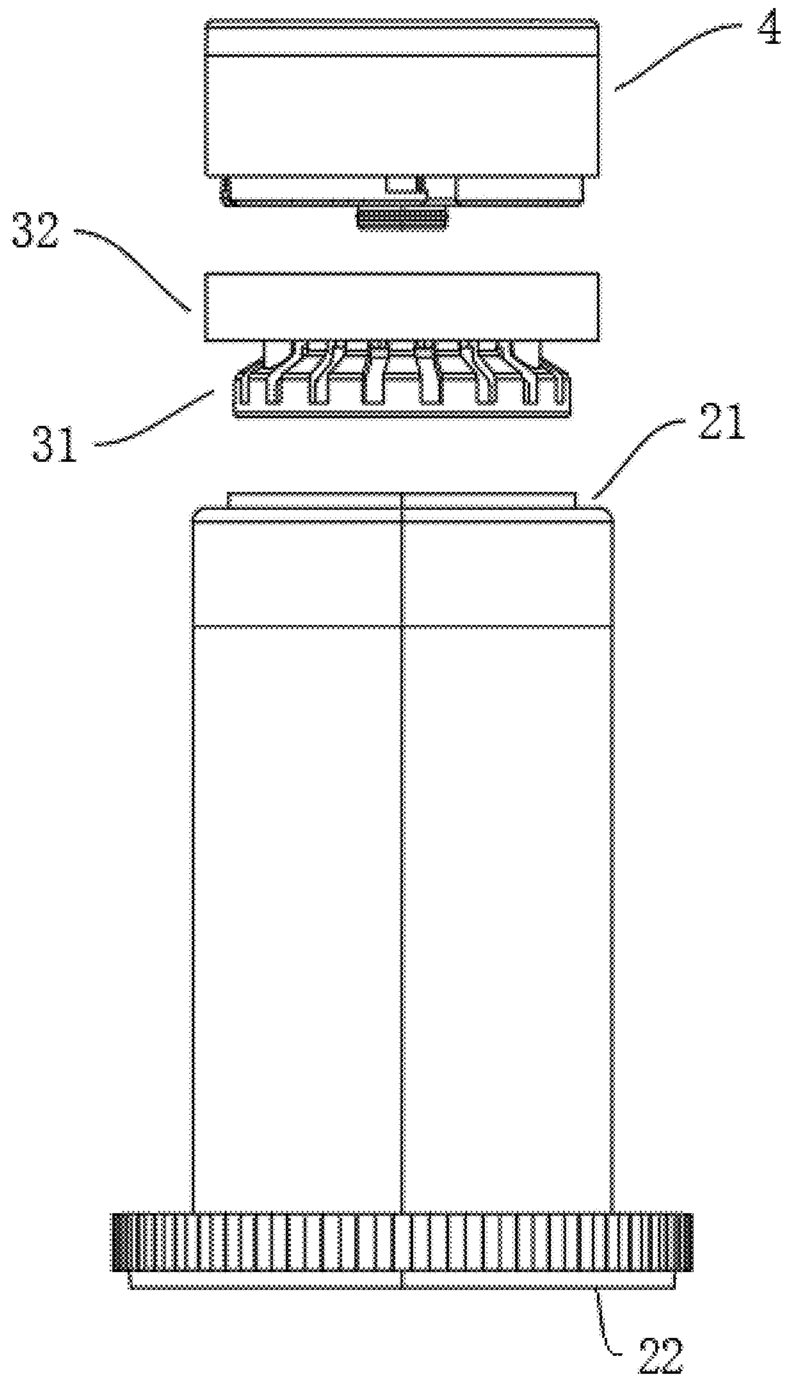
FIG. 3 is an exploded view of a liquid warming and ejecting device according to the present utility model for the purpose of exhibiting a fixing assembly.
Figure 4:
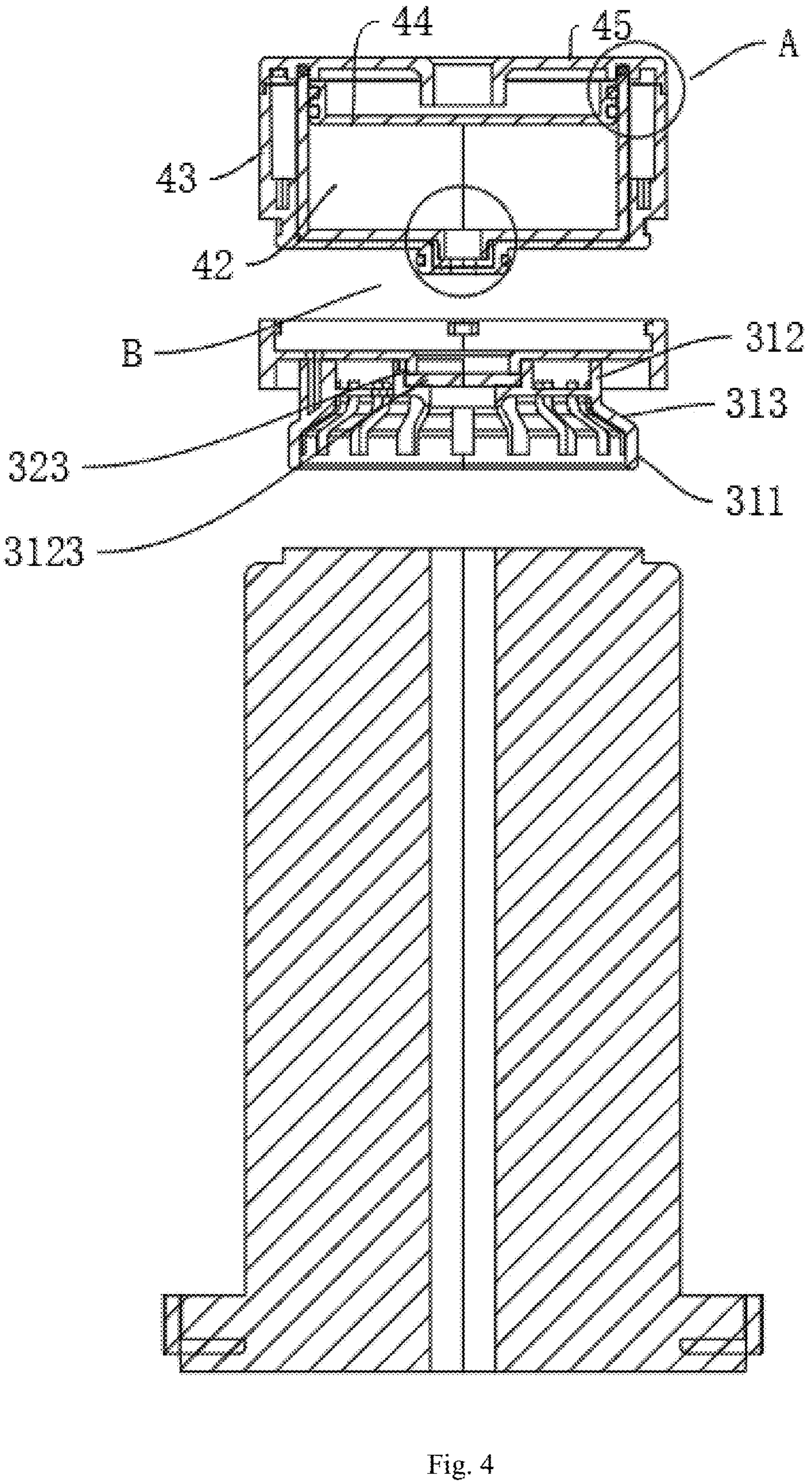
FIG. 4 is a sectional view of a liquid warming and ejecting device according to the present utility model.
Figure 5:
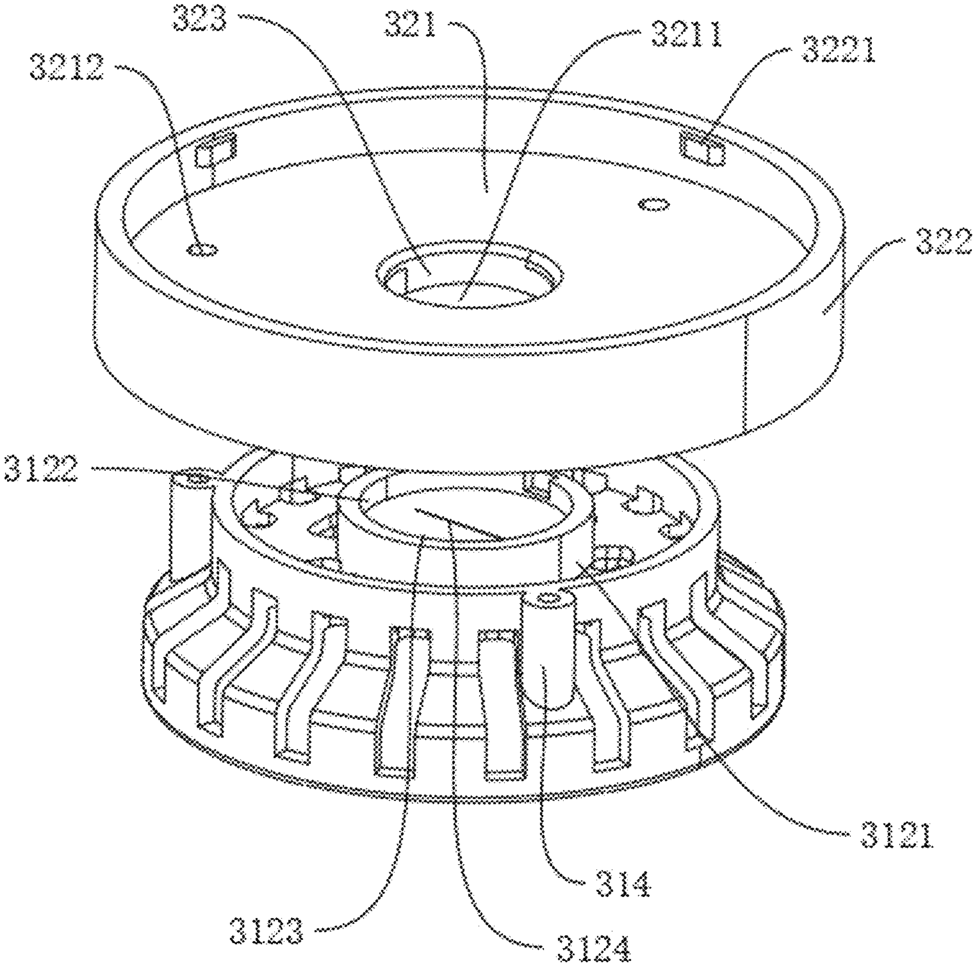
FIG. 5 is a schematic exploded view of a fixing assembly of a liquid warming and ejecting device according to the present utility model.
Figure 6:
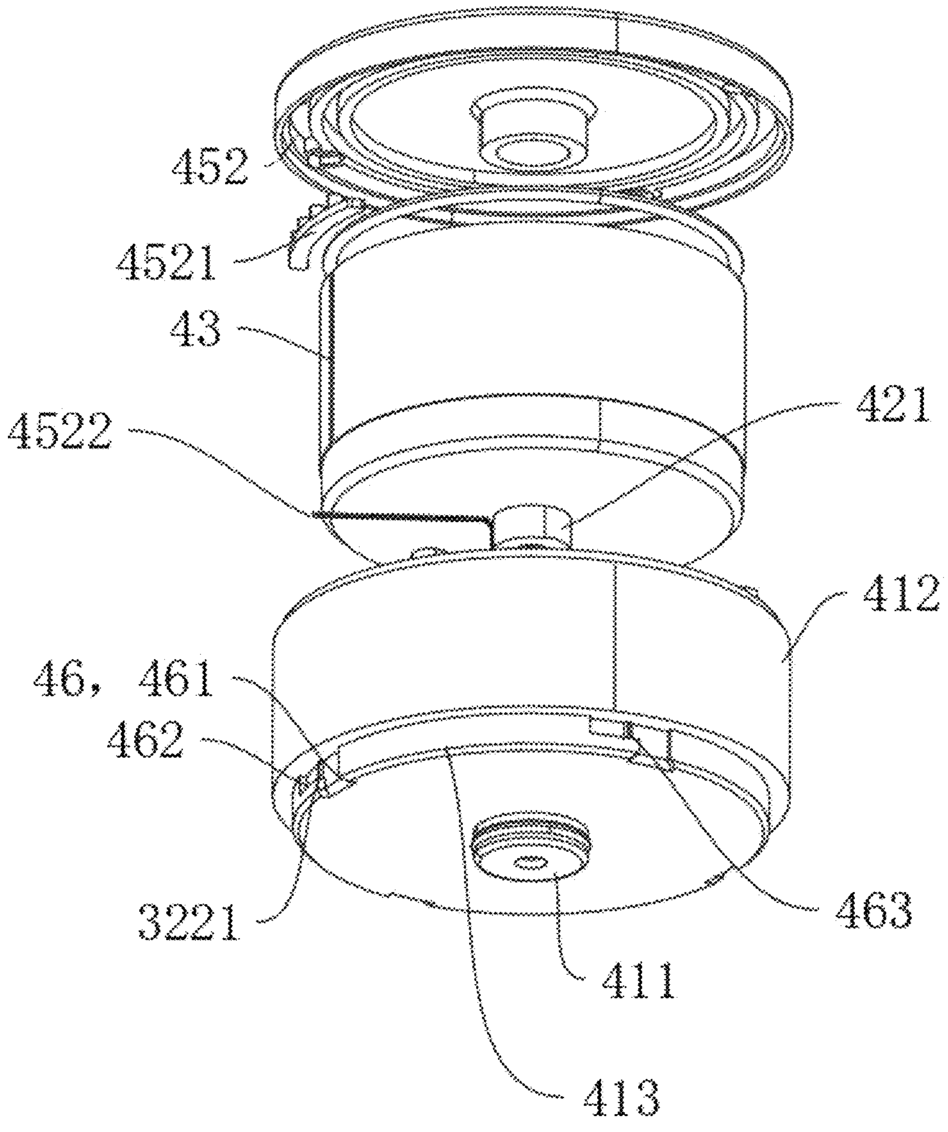
FIG. 6 is a schematic exploded view of a liquid heating and ejecting assembly of a liquid warming and ejecting device according to the present utility model.
Figure 7:
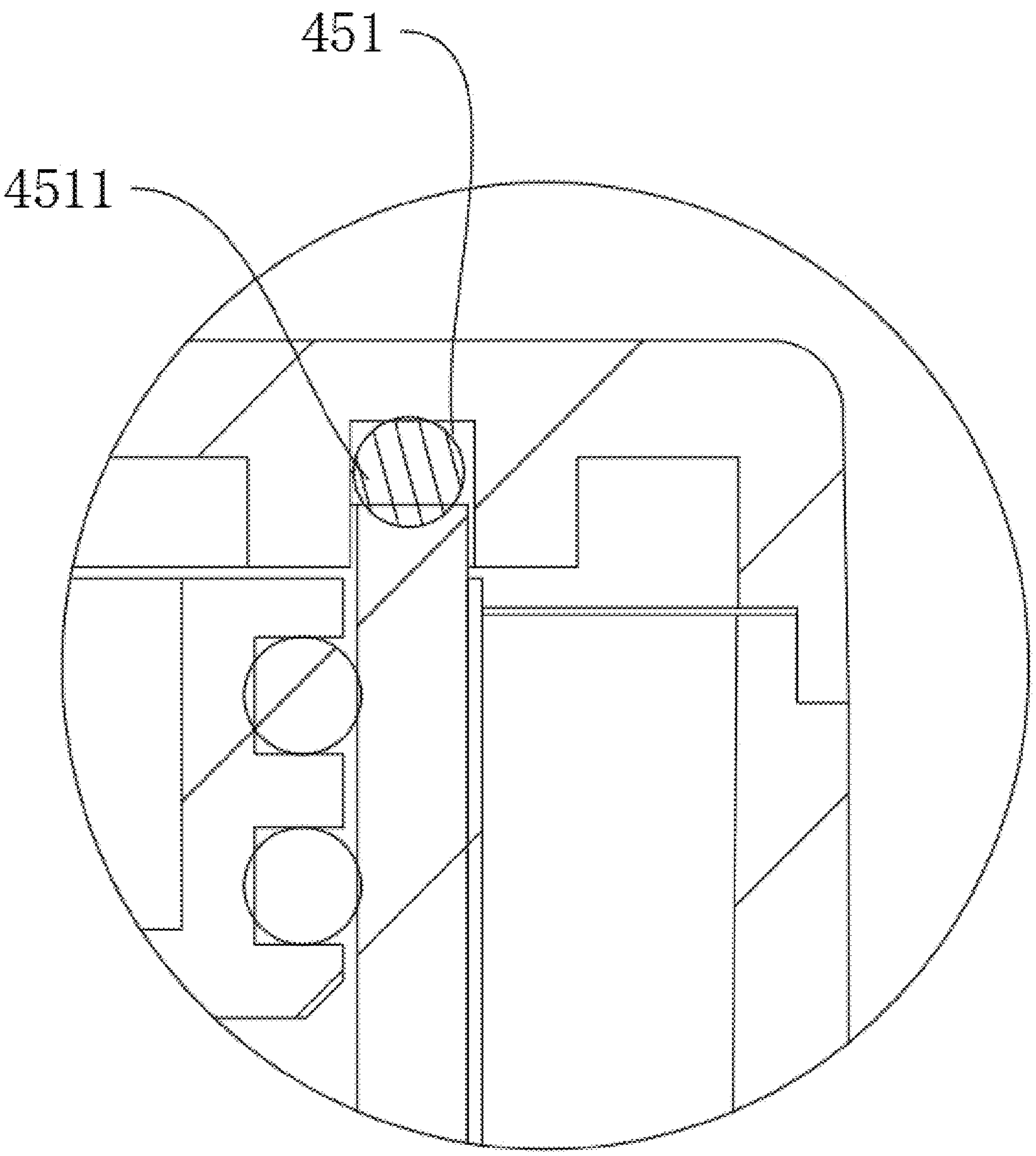
FIG. 7 is a schematic enlarged view of Part A.
Figure 8:
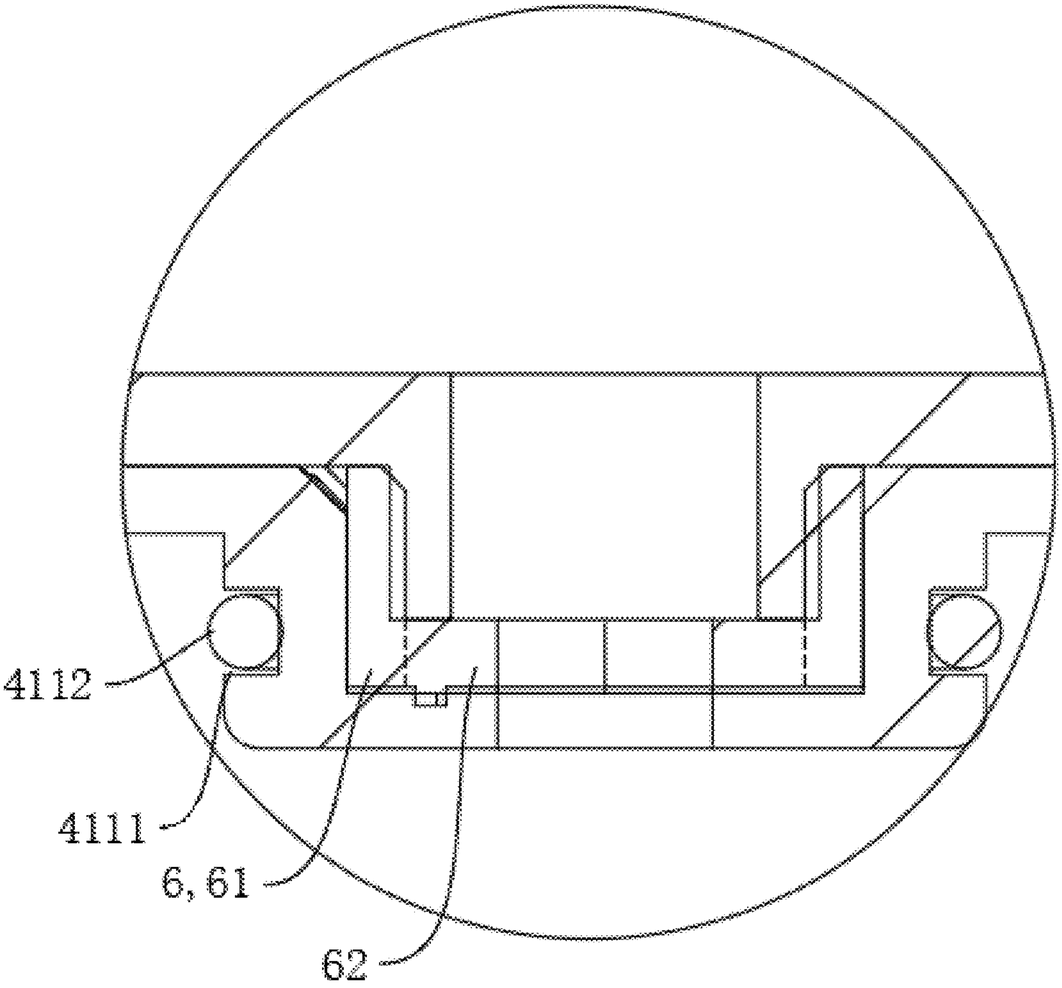
FIG. 8 is a schematic enlarged view of Part B.

Referring to FIGS. 1-8, the present utility model provides a liquid warming and ejecting device, including a housing 1, a liquid discharge cylinder 2, a fixing assembly 3, and a liquid heating and ejecting assembly 4. Both the liquid discharge cylinder 2 and the liquid heating and ejecting assembly 4 are disposed in the housing 1; the liquid heating and ejecting assembly 4 may store a liquid, heat and eject the liquid into the liquid discharge cylinder 2, and discharge the liquid via the liquid discharge cylinder 2 for a user to use; the fixing assembly 3 is located in the housing 1 and between the liquid discharge cylinder 2 and the liquid heating and ejecting assembly 4, so as to facilitate fixing of the liquid discharge cylinder 2 and the liquid heating and ejecting assembly 4.

The housing 1 includes an arc male piece 11 and an arc female piece 12; the male piece 11 and the female piece 12 may be buckled to each other to form a cylindrical receiving groove; and the liquid discharge cylinder 2 and the liquid heating and ejecting assembly 4 are fixed in the receiving groove. It should be understood that the fixing between the male piece 11 and the female piece 12 may be achieved by clamping or other existing structures, which fall within the prior art and will not be illustrated and described in detail in the present application.

The liquid discharge cylinder 2 includes a first end 21 and a second end 22 which are disposed opposite to each other; the first end 21 and the second end 22 are arranged in a direction that is an axis direction of the liquid discharge cylinder 2; a channel 23 is provided in the liquid discharge cylinder 2 in its axis direction; both ends of the channel 23 extend to the first end 21 and the second end 22, respectively, with the first end 21 disposed towards the liquid heating and ejecting assembly 4 and the second end 22 facing the outside of the housing 1; and when in use, the liquid is injected from the first end 21 and may be discharged from the second end 22.

The fixing assembly 3 includes a fixing bracket 31 and a fixing member 32; the fixing bracket 31 includes a bottom ring 311, a convex ring 312 and a plurality of inclined plane portions 313; the bottom ring 311 and the convex ring 312 are connected by means of the plurality of inclined plane portions 313; a plurality of fixing columns 314 provided with internal threaded holes is fixed to the upper sides of the plurality of inclined plane portions 313; a mounting ring 3121 is fixed inside the convex ring 312; a mounting groove 3122 is provided inside the mounting ring 3121; a silicone rubber plug 3123 is fixed inside the mounting groove 3122; and a liquid discharge slit 3124 is provided in the middle of the silicone rubber plug 3123. The fixing bracket 31 is located at the first end 21, and may be fixed in the liquid discharge cylinder 2; the mounting groove 3122 may be inserted into the channel 23 to be communicated with the channel 23; the fixing assembly may be used for fixing the liquid heating and ejecting assembly 4 and fixing the silicone rubber plug to a position on the channel 23 corresponding to the second end 22; and the liquid may be squeezed into the channel 23 from the liquid discharge slit 3124. It should be noted that the fixing bracket 31 and the liquid discharge cylinder 2 are in an integral structure, the liquid discharge cylinder 2 is formed by secondary injection molding, and separating the fixing bracket 31 from the liquid discharge cylinder 2 in the drawings is for display purposes only.

The fixing member 32 includes a disc 321 and an outer ring 322, the disc 321 is fixed in the outer ring 322, a discharge hole 3211 is provided in the middle of the disc 321 and may be communicated with the channel 23 for discharging the liquid. The surface of the disc 321 is provided with a plurality of through holes 3212; retaining screws may be penetratively disposed in the through holes 3212 and are in threaded connection to the fixing columns 314, such that the retaining screws can be fixed with the fixing bracket 31 into a whole; a press ring 323 is fixed to a side of the disc 321 close to the fixing bracket 31; the press ring 323 and the discharge hole 3211 are disposed coaxially; with a fixed state between the fixing bracket 31 and the fixing member 32, the press ring 323 tightly bears against the silicone rubber plug 3123 so as to tightly bear against the position of the silicone rubber plug 3123. A plurality of bump 3221 are provided on an inner peripheral surface of the outer ring 322; the bumps 3221 are used for quick connection with the liquid heating and ejecting assembly 4.

The liquid heating and ejecting assembly 4 includes a liquid storage housing 41, a liquid storage tank 42, a warming device 43, a piston 44 and a seal cover 45. The liquid storage housing 41 and the fixing bracket 31 are connected; the liquid storage tank 42 is fixed installed in the liquid storage housing 1; one end of the liquid storage housing 41 is fixedly provided with a first discharge pipe 41 communicated to an inner space of the liquid storage housing; one end of the liquid storage tank 42 is fixedly provided with a second discharge pipe 421 communicated to the liquid storage tank; when the liquid storage tank 42 is fixed in the liquid storage housing 41, the second discharge pipe 421 is inserted in the first discharge pipe 411; the second discharge pipe 421 may be inserted in the press ring 323; and an end of the second discharge pipe 421 is also butted with the silicone rubber plug 3123, such that the second discharge pipe 421 is communicated to the channel 23, and the liquid in the liquid storage tank 42 may be squeezed into the channel 23 via the first discharge pipe 411, the second discharge pipe 421 and then via the silicone rubber plug 3123.

The liquid may be stored in the liquid storage tank 42, and may be essential oil, bath foam, a hand sanitizer or the like; the warming device 43 is of an annular structure, and is sleeved outside the liquid storage tank 42 and fixed in the liquid storage housing 41; the inner side of the warming device 43 is butted with the outer periphery of the liquid storage tank 42; and the warming device 43 may heat the liquid in the liquid storage tank 42. One end of the liquid storage tank 42 is open; the piston 44 is located in the liquid storage tank 42; the side peripheral of the piston 44 is butted with the inner side of the liquid storage tank 42 for blocking the liquid; the piston 44 may move to push the liquid in the liquid storage tank 42 to move; the seal cover 45 is fixed to the open end of the liquid storage tank 42; and the seal cover 45 is provided with an opening in the middle, and may apply a pressure to the piston 44 via the opening to move the piston 44, pushing the liquid in the liquid storage tank 42 to flow from the silicone rubber plug 3123 through the channel 23 and then heating and ejecting the liquid. Further, a power device 5 is disposed in the housing 1 and may push the piston 44 to move; the power device 5 may be an air pump or a push rod, but not limited thereto; and the power device 5 may push the piston 44 to move to thus push the liquid.

During work, the warming device 43 can be located outside the liquid storage tank 42 to produce heat for warming a liquid in the liquid storage tank 42 to certain temperature, and the piston 44 can move towards the liquid discharge cylinder 2 and thus push the heated liquid in the liquid storage tank 42 to be discharged via the first discharge pipe 411 and the second discharge pipe 421; and the discharged liquid under continuous pressurized advancing of the piston is discharged from the liquid discharge slit 3124 in the silicone rubber plug 3123 into the channel 23 and then discharged from the second end 22, thereby achieving the heating and ejecting of the liquid to provide better use experience to a user.

As an embodiment, the liquid storage housing 41 includes a large-diameter ring 412 and a small-diameter ring 413; the large-diameter ring 412 is fixed to an end of the small-diameter ring 413 away from the liquid discharge cylinder 2; the small-diameter ring 413 may be inserted in the outer ring 322 of the fixing member 32; a plurality of fixing grooves 46 is provided in the side periphery of the small-diameter ring 413; the bumps 3221 may be installed in the fixing grooves 46; the fixing grooves 46 include longitudinal grooves 461 and circumferential grooves 462; one end of each longitudinal groove 461 is connected to the corresponding circumferential groove 462; each longitudinal groove 461 extends in a direction that is the axis direction of the liquid storage housing 41; each circumferential groove 462 extends along the peripheral surface of the liquid storage housing 41; the bumps 3221 may be inserted in the longitudinal grooves 461, and may be rotated, by rotating the liquid storage housing 41, to the ends of the circumferential grooves 462, in such a way that the liquid storage housing 41 and the fixing member 32 can be limited in position. It should be noted that the names of the large-diameter ring 412 and the small-diameter ring 413 are for distinguishing purposes only, and the dimensional relationship between the two is noted limited to this.

Further, a clamping protrusion 463 is fixed in each circumferential groove 462, and may be clamped and connected to the corresponding bump 3221, both ends of which are provided with inclined planes 3222, in such a way that, when turning to the end of the corresponding circumferential groove 462, the bump 3221 is not likely to fall off when rotating without application of force; the inclined planes 3222 may facilitate the user to successfully turn the bumps 3221 into or out of the circumferential grooves 462 by means of rotation, enabling the user to quickly assemble or separate the liquid storage housing 41 to or from the fixing member 32.

As an embodiment, the seal cover 45 is detachably connected to the liquid storage housing 41. Specifically, the seal cover 45 is bolted to the liquid storage housing 41, and the seal cover 45 is removable to enable the user to disassemble the liquid storage tank 42 for replacement, in such a way that the liquid can be added or replaced with an additional type of liquid.

As an embodiment, a first annular groove 451 is provided in a side of the seal cover 45; a first seal ring 4511 is fixed in the first annular groove 451; one end of the liquid storage tank 42 may be inserted in the first annular groove 451 and tightly bear against the first seal ring 4511, enabling the seal cover 45 to seal the end of the liquid storage tank 42 in a good condition to thus keep an airtight environment inside the liquid storage tank 42. A second annular groove 4111 is provided in the outer periphery of the first discharge pipe 411; and a second seal ring 4112 is fixed in the second annular groove 4111, and tightly bears against the inner side of the press ring 323 to avoid liquid leakage.

As an embodiment, a rubber seal ring 6 is disposed on the inner side of the first discharge pipe 411; the rubber seal ring 6 includes a first ring portion 61 and a second ring portion 62; the second ring portion 62 is located on the inner periphery of the first ring portion 61; the outer periphery of the first ring portion 61 may tightly bear against the inner periphery of the first discharge pipe 411; an end surface of the second ring portion 62 tightly bears against an inner end surface of the first discharge pipe 411; and the second discharge pipe 421 may be disposed to tightly press the rubber seal ring 6, thereby avoiding leakage of the liquid into the liquid storage housing 41 during squeezing of the liquid.

An accommodation groove 452 is disposed in the seal cover 45; a temperature-controlled heating current-conducting plate 4521 is fixed in the accommodation groove 452, and is used for connection with an external power source; a temperature control assembly 4522 is fixed to a lower side of the rubber seal ring 6, and specifically, the temperature control assembly 4522 is a patch thermistor; the temperature control assembly 4522 is connected to the temperature-controlled heating current-conducting plate 4521; the warming device 43 is connected to the temperature-controlled heating current-conducting plate 4521; and when the heating temperature is too high, the temperature control assembly 4522 may stop the warming device 43 from continuous heating, in such a way that the liquid can be kept heating to a stable temperature. It should be noted that the current-conducting plate with heat control and overheating protection falls within the prior art, and its specific circuit structure will not be described in detail in the present application.

The principle of implementing the present utility model is as follows: during work, the warming device 43 can be located outside the liquid storage tank 42 to produce heat for warming a liquid in the liquid storage tank 42 to certain temperature, and the piston 44 can move towards the liquid discharge cylinder 2 and thus push the heated liquid in the liquid storage tank 42 to be discharged via the first discharge pipe 411 and the second discharge pipe 421; and the discharged liquid under continuous pressurized advancing of the piston is discharged from the liquid discharge slit 3124 in the silicone rubber plug 3123 into the channel 23 and then discharged from the second end 22, thereby achieving the heating and ejecting of the liquid to provide better use experience to a user.

Those skilled in the art can understand that, in the absence of conflict, the above preferred solutions can be freely combined or superimposed.

It should be understood that the above embodiments are only exemplary but not restrictive, and without departing from the basic principle of the present utility model, those skilled in the art can make a variety of obvious or equivalent modifications or substitutions to the above details, which should be included within the scope of the claims of the present utility model.

What is claimed is:

1. A liquid warming and ejecting device, comprising a liquid discharge cylinder and a liquid heating and ejecting assembly, wherein the liquid discharge cylinder comprises a first end and a second end which are disposed opposite to each other, the second end is disposed towards the liquid heating and ejecting assembly, and a channel is disposed in the liquid discharge cylinder; a silicone rubber plug is fixed at a position on the channel corresponding to the second end, and is provided with a liquid discharge slit in a middle thereof;

the liquid heating and ejecting assembly comprises a liquid storage housing, a liquid storage tank, a warming device, and a piston, the liquid storage tank is fixed in the liquid storage housing, the warming device is fixed on an outer periphery of the liquid storage tank, and the piston is located inside the liquid storage tank; and a first discharge pipe is fixed to an end of the liquid storage housing, a second discharge pipe is fixed to an end of the liquid storage tank, and the second discharge pipe is inserted in the first discharge pipe and is capable of being communicated to a mounting slit and the channel;

wherein the liquid warming and ejecting device further comprises a fixing assembly, the fixing assembly comprises a fixing bracket and a fixing member, the fixing bracket comprises a bottom ring, a convex ring, and a plurality of inclined plane portions, the bottom ring and the convex ring are connected by means of the inclined plane portions, and a plurality of fixing columns are fixed to upper sides of the inclined plane portions; and the fixing member comprises a disc and an outer ring, the disc is fixed in the outer ring, a discharge hole is provided in the middle of the disc, and a surface of the disc is provided with a plurality of through holes that are connected to the fixing columns.

2. The liquid warming and ejecting device according to claim 1, wherein a mounting ring is fixed inside the convex ring, in which a mounting groove is provided, the mounting groove can be is capable of being inserted in the channel, and the silicone rubber plug is fixed inside the mounting groove.

3. The liquid warming and ejecting device according to claim 2, wherein a press ring is fixed to a side of the disc adjacent to the fixing bracket, and is disposed coaxial with the discharge hole, and a press hole is capable of being tightly bear against the silicone rubber plug.

4. The liquid warming and ejecting device according to claim 1, wherein an inner side of the warming device bears against the outer periphery of the liquid storage tank.

5. The liquid warming and ejecting device according to claim 1, wherein the liquid storage housing comprises a large-diameter ring and a small-diameter ring which are capable of being inserted in the outer ring; and a plurality of bumps are fixed to an inner side of the outer ring, a plurality of fixing grooves are provided on a side periphery of the small-diameter ring, the fixing grooves comprise longitudinal grooves and circumferential grooves, and the bumps are capable of being inserted in the longitudinal grooves and is capable of rotating to ends of the circumferential grooves.

6. The liquid warming and ejecting device according to claim 5, wherein the circumferential grooves are each provided with a clamping protrusion, which is capable of being clamped and connected to the corresponding bump, both ends of which are provided with inclined planes.

7. The liquid warming and ejecting device according to claim 1, wherein the liquid storage tank is provided with an open end, the liquid heating and ejecting assembly further comprises a sealed cover capable of sealing the liquid storage tank, and the sealing cover is detachably connected to the liquid storage housing.

8. The liquid warming and ejecting device according to claim 7, wherein a first annular groove is provided on a side of the sealing cover, the first annular groove is internally fixed with a first seal ring, and the liquid storage tank is capable of being inserted in the first annular groove and tightly bear against the first seal ring; and a second annular groove is provided in a periphery of the first discharge pipe, a second seal ring is fixed in the second annular groove, and the second seal ring tightly bears against the press ring.

9. The liquid warming and ejecting device according to claim 7, wherein a first rubber seal ring is disposed on an inner side of the first discharge pipe; the rubber seal ring comprises a first ring portion and a second ring portion located on an inner periphery of the first ring, an outer periphery of the first ring portion tightly bears against an inner periphery of the first discharge pipe, and an end surface of the second ring portion tightly bears against an inner end surface of the first discharge pipe.

* * * * *